United States Patent [19]

Wingler

[11] 3,893,977
[45] July 8, 1975

[54] PULVERULENT BINDERS FOR THE ELECTROSTATIC POWDER-SPRAYING PROCESS

[75] Inventor: Frank Wingler, Leverkusen, Germany

[73] Assignee: Bayer Aktiengesellschaft, Leverkusen, Germany

[22] Filed: May 11, 1973

[21] Appl. No.: 359,579

[30] Foreign Application Priority Data
May 27, 1972  Germany............................ 2225958

[52] U.S. Cl. ....... 260/77.5 TB; 117/128.4; 117/132; 260/37 N; 260/42.21; 260/42.52; 260/77.5 CR; 260/80.81
[51] Int. Cl............................................. C08g 22/32
[58] Field of Search .. 260/80.81, 77.5 TB, 77.5 CR; 252/182

[56] References Cited
UNITED STATES PATENTS
3,297,621   1/1967   Taft ................................ 260/80.72
3,625,911   12/1971  Redman et al............... 260/77.5 TB Primary Examiner—M. J. Welsh
Attorney, Agent, or Firm—Joseph C. Gil

[57] ABSTRACT

A pulverulent solvent free composition of matter suitable for use as a binder for powder lacquers particularly for automobile bodies and the like is disclosed. The powder is based on A. 40 to 98 parts by weight of copolymers with an average molecular weight of from 3,000 to 20,000 of
  i. 20 to 60% by weight of styrene, $\alpha$-methyl-styrene, o-chlorostyrene, p-chlorostyrene and/or p-tert.-butyl styrene;
  ii. 30 to 65% by weight of acrylic acid alkyl ester with 1 to 12 carbon atoms in the alkyl radical and/or methacrylic acid alkyl ester with 2 to 12 carbon atoms in the alkyl radical;
  iii. 0 to 30% by weight of methacrylic acid methyl ester, and
  iv. 3 to 20% by weight of acrylic acid and/or methacrylic acid glycidyl ester;
B. 1 to 20 parts by weight of polycarboxylic acid and/or polycarboxylic acid anhydride, and
C. 1 to 20 parts by weight of a blocked polyisocyanate.

3 Claims, No Drawings

PULVERULENT BINDERS FOR THE ELECTROSTATIC POWDER-SPRAYING PROCESS

It is known from U.S. Pat. Nos. 2,604,463 and 3,297,621 that stoving lacquers can be produced from the glycidyl esters of acrylic or methacrylic acid.

Copolymers of this kind were also proposed for the production of electrostatically sprayable powder resins in German Offenlegungsschrifts Nos. 2,057,577 and 2,064,916. Polycarboxylic acid, polyanhydrides and polyamines are mentioned as hardeners. Despite otherwise favorable mechanical properties, the powder lacquer mixtures prepared in accordance with German Offenlegungsschrifts Nos. 2,057,577 and 2,064,916 show inadequate resistance to aromatic and ester solvents which make them unsuitable for certain applications, for example the surface-lacquering of motor cars. Although the solvent resistance of the binders can be improved by increasing the crosslink density, i.e., the proportion of glycidyl acrylates or methacrylates, to beyond 20% by weight, such an increase can only be obtained at the expense of a serious deterioration in the mechanical properties, above all elasticity, due to overcrosslinking. In addition, powders with an increased glycidyl ester content are too expensive for economical application.

Powder resins based on polyesters containing hydroxyl groups and solid, blocked polyisocyanates are also known. Mixtures of this kind are described for example in British Pat. No. 1,265,634. One disadvantage of these mixtures is that the blocking agent is liberated during stoving and leaves the layer. Condensation can occur on colder parts of the stoving chambers, especially in the case of high-boiling blocking agents such as ε-caprolactam or phenol for example, in addition to which pollution of the exhaust air is a serious problem. Under stoving conditions, the volatile constituents of these systems can amount to as much as 10% by weight, based on the binder/hardener mixture.

It has now surprisingly been found that the addition of blocked polyisocyanates to combinations of certain copolymers containing glycidyl groups with certain polycarboxylic acids or polycarboxylic acid anhydrides is substantially free from the disadvantage of leading to the deposition of volatile constituents under stoving conditions. With a proportion of up to 20% by weight of blocked polyisocyanates, based on the total amount of binder, the proportion of volatile constituents deposited under stoving conditions amounts to at most 2% by weight and, in general, to less than 1% by weight. At the same time, it is possible to produce lacquer layers with considerably improved resistance to solvents by using binder combinations of this kind. In addition, the lacquer layers are completely free from pores, which was surprising insofar as the simultaneous presence of carboxylic acid and isocyanate groups had been expected, under stoving conditions, to lead to the evolution of carbon dioxide and so the formation of pores attributable to this carbon dioxide had been expected in the layer of lacquer.

Accordingly, the invention relates to a composition of matter comprising mixtures of 1. 40 to 98 parts by weight of copolymers with an average molecular weight of from 3,000 to 20,000 of
   a. 20 to 60% by weight of styrene, α-methylstyrene, o-chlorostyrene, p-chlorostyrene and/or p-tert.-butyl styrene;
   b. 30 to 65% by weight of acrylic acid alkyl esters with 1 to 12 carbon atoms in the alkyl radical and/or methacrylic acid alkyl esters with 2 to 12 carbon atoms in the alkyl radical;
   c. 0 to 30% by weight of methacrylic acid methyl ester and
   d. 3 to 20% by weight of acrylic acid and/or methacrylic acid glycidyl ester;
2. 1 to 20 parts by weight of a polycarboxylic acid and/or polycarboxylic acid anhydride and
3. 1 to 20 parts by weight of a blocked polyisocyanate.

This composition of matter is particularly suitable as binder in the production of powder lacquers suitable for the electrostatic powder spraying process.

In their uncrosslinked state, binders for the electrostatic powder spraying process should be brittle, readily pulverizable resins which, as powders, remain free-flowing and free from lumps at temperatures of up to 40°C. Following electrostatic application to the substrate, the powders should spread evenly at temperatures of from 80° to 120°C and should lend themselves to baking at temperatures of above 130°C to form insoluble and infusible coatings. In addition, the powders should be able to accept an electrostatic charge and to hold the electrical charge on metal articles for a while before baking. In addition, binders of this kind should not crosslink prematurely in the vicinity of their levelling temperature because they are generally mixed in the melt with pigments, catalysts and levelling agents at temperatures around 100°C. Where binder/crosslinker combinations are used, as in the present case, the component acting as crosslinker should melt at the temperature at which the resin itself melts and should be compatible and homogeneously miscible with the resin. When the mixture solidifies, the crosslinker added should not adversely affect the stability of the mixture in storage at temperatures of up to 40°C, nor should the system disintegrate again on cooling. After levelling and baking, the compatible mixture of crosslinker and resin should give a high-gloss weather-resistant coating which is unaffected by chemicals and solvents. In addition to compatibility of the components, these requirements also necessitate the sole use of compounds melting at temperatures above 40°C in the case of the binders used in accordance with the invention as well, so as to enable coating powders with a grain size of from about 30 to 120 μ which are still free-flowing at 40°C to be produced.

The copolymers used in accordance with the invention are produced by conventional bulk polymerization, solution polymerization, dispersion polymerization and bead polymerization processes, preferably by solution or bulk polymerization. Processes of this kind are described for example in Methoden der Organischen Chemie, Houben-Weyl, 4th Edition, Vol. 14/1, pages 24–556 (1961). In cases where polymerization is carried out in solution, it is possible to use such solvents as methylene chloride, ethanol, isopropanol, n-propanol, n-butanol, isobutanol, tert.-butanol, acetic acid methyl- or butyl ester, acetone, methyl ethyl ketone, benzene, toluene, etc.

The polymerization reactions are carried out at temperatures of from 40° to about 180°C.

Examples of suitable initiators include percarbonates, peresters, such as tert.-butyl perpivalate and peroctoate, benzoyl peroxide, o-methoxy benzoyl peroxide, dichlorobenzoyl peroxide, azodiisobutyrodinitrile, being used in quantities of from 0.5 to 3% by weight, based on the quantity of monomer.

The usual molecular weight regulators such as thioglycol, thioglycerin or tert.-dodecyl mercaptan, can also be used.

The solvent is removed from the copolymer solution in suitable apparatus, preferably in evaporator screws, at temperatures of from 90° to 180°C, for example in accordance with the process described in German Offenlegungsschrift 2,005,691 which corresponds to U.S. Pat. Application Ser. No. 110,696 filed on Jan. 28, 1971 now U.S. Pat. No. 3,741,272 followed by cooling, granulation and grinding. However, the copolymers can also be isolated by other methods, for example by spray drying, removing the solvent with steam accompanied by dispersion in water or, in accordance with German Offenlegungsschrift 2,008,711 by precipitation with water from a solvent miscible with water. The copolymers used have average molecular weights, as determined by the method of vapor-pressure reduction in toluene, of from about 3,000 to 20,000, preferably from 6,000 to 10,000. Powders prepared from copolymers such as these with a particle size of from about 30 to 120 $\mu$ are still free-flowing at temperatures of at least 40°C, have levelling temperatures of from about 80° to 120°C and can be baked at temperatures upwards of about 130°C to 220°C, preferably at temperatures of from 160° to 180°C.

The copolymers used in accordance with the invention are copolymers of a. 20 to 60% by weight of styrene, $\alpha$-methylstyrene, o-chlorostyrene, p-chlorostyrene and/or p-tert.-butyl styrene;

b. 30 to 65% by weight of acrylic acid alkyl ester with 1 to 12 carbon atoms in the alkyl radical and/or methacrylic acid alkyl ester with 2 to 12 carbon atoms in the alkyl radical;

c. 0 to 30% by weight of methacrylic acid methyl ester and d. 3 to 20% by weight of acrylic acid and/or methacrylic acid glycidyl ester.

Preferred acrylic acid alkyl esters include acrylic acid methyl, ethyl, propyl, butyl and 2-ethyl-hexyl ester. Preferred methacrylic acid alkyl esters containing 2 to 12 carbon atoms in the alkyl radical are methacrylic acid ethyl, propyl and butyl ester.

The copolymers can be mixed with up to 150% by weight, preferably with up to 100% by weight, of inorganic or organic pigments, based on the amount of copolymer, in the melt at temperatures of from 80° to about 120°C. The following are mentioned as examples of pigments: titanium dioxide, iron oxides, chromium oxide, phthalocyanine and azo pigments.

Levelling agents such as silicones, polyesters, cellulose derivatives, oligomeric acrylates, phosphoric acid esters and also catalysts, such as organic and inorganic acids, tertiary amines, dicyanodiamide and tin compounds, boron trifluoride adducts, can additionally be added to the melts (in quantities of preferably from 0.1 to 5% by weight, based on copolymer).

It is of course also possible to add pigments and levelling agents to the monomers before polymerization or, in the case of solution polymerization, to the copolymer solution before the solvent is removed from it.

The polycarboxylic acids or polycarboxylic acid anhydrides used in the binders employed in accordance with the invention are aliphatic or cycloaliphatic polycarboxylic acids or polycarboxylic acid anhydrides preferably dicarboxylic acids or anhydrides. Examples include oxalic acid, tartaric acid, propane-1,3-dicarboxylic acid, butane-1,4-dicarboxylic acid, pentane-1,5-dicarboxylic acid, adipic acid, azelaic acid, suberic acid, sebacic acid, fumaric acid or maleic acid, polyazelaic acid anhydride, pyromellitic acid, trimellitic acid, tetrahydrophthalic acid anhydride, endomethylene-tetrahydrophthalic acid anhydride or their nuclear-methylated derivatives. It is preferred to use polycarboxylic acids or polycarboxylic acid anhydrides with a molecular weight of less than 250.

The blocked polyisocyanates used in accordance with the invention are reaction products of polyisocyanates with blocking agents which are liberated at temperatures of from 130° to 200°C. The blocked polyisocyanates used in accordance with the invention have softening points above 40°C, preferably above 50°C. Suitable polyisocyanates include diisocyanato toluenes, diisocyanato diphenyl methanes, hexamethylene diisocyanate, 1-isocyanato-3,3,5-trimethyl5-isocyanato methyl cyclohexane, reaction products of the aforementioned polyisocyanates with deficits of polyhydric alcohols, such as, in particular, the reaction product of 3 mols of 2,4-diisocyanato toluene with 1 mol of trimethylol propane, isocyanurate polyisocyanates which can be obtained by trimerizing the aforementioned diisocyanates such as, in particular, the isocyanurate-triisocyanate which can be obtained by trimerizing 2,4-diisocyanato toluene, optionally in admixture with hexamethylene diisocyanate, etc. Examples of suitable blocking agents include phenol, o-cresol, oximes or $\epsilon$-caprolactam. Polyisocyanates which have been blocked with $\epsilon$-caprolactam are preferably used in the binders employed in accordance with the invention. Other blocked polyisocyanates suitable for the binders to be employed in accordance with the invention are described in British Pat. No. 1,265,634.

The preparation of the composition of matter in accordance with the invention by mixing the components is preferably carried out in a mixing screw at temperatures of from 80° to 120°C together with the incorporation of the pigments, levelling agents and catalysts. The mixing times should amount to between about 1 and 10 minutes. Prolonged mixing results in precrosslinking of the product. Under these conditions a homogeneous mixture which does not disintegrate, even when cooled, is obtained.

The solvent-free, mixtures, which may be pigmented and which, in their uncrosslinked state, are brittle after cooling, are ground to a grain size of from 30 to 120 $\mu$. They may be separated according to grain size.

The powders are applied to suitable substrates, especially metals, by conventional electrostatic powder-spraying processes (40 to 90 KV), cf. D. R. Davis "Coating with elektrostatic dreyspray" in Plastics Technology, June 1962, pages 37 – 38.

The powder lacquers based on the binders in accordance with the invention have levelling temperatures of from about 80° to 120°C and can be baked over periods of from 15 to 30 minutes at temperatures of from 130° to 220°C, preferably at temperatures of from 160° to 180°C.

The baked films (40 to 300 $\mu$ thick) show outstanding bond strength and hardness coupled with elasticity. They are also distinguished by their high gloss, their weather resistance and their outstanding resistance to aromatic solvents.

Powder lacquers produced with the composition of matter in accordance with the invention are suitable for coating domestic appliances, metal components used in automobile construction and metal components exposed to heavy weathering, such as automobile bodywork, facade panels, tubes, wire netting and machines of the kind used in forestry and agriculture.

The invention is illustrated by the following Examples. The parts quoted in the Examples are parts by weight unless otherwise stated.

PREPARATION OF COPOLYMERS

Resin A 400 g of styrene, 200 g of methyl methacrylate, 150 g of glycidyl methacrylate and 250 g of butyl acrylate are introduced under nitrogen into a 3-liter sulphonation vessel with a wall-sweeping helical stirrer, after which 15 g of tert.-dodecyl mercaptan are added and the mixture is heated to reflux. 10 g of tert.-butyl perpivalate in the form of a 75% solution in dichloroethane are added dropwise over a period of 1.5 hours, followed by 5 g of tert.-butyl peroctoate. The melt obtained is degassed in vacuo at 160°C and cast onto a plate. After cooling, the resin is crushed in a crossbeater mill.

The average molecular weight, measured by vapor-pressure reduction in toluene, amounts to 6,800 and the epoxide equivalent to 1,040.

Resin B

The procedure is as described above, except that the following monomer mixture is used:
250 g of styrene, 350 g of methyl methacrylate, 100 g of butyl methacrylate, 150 g of glycidyl methacrylate, 150 g of ethyl hexyl acrylate.

The average molecular weight amounts to 7200 and the epoxide equivalent to 1,020.

Comparison test without blocked polyisocyanate 100 g batches of resins A and B are each homogeneously mixed for 1 minute with 7.5 g of adipic acid and 0.4 g of benzyl dimethyl amine in a kneader heated to 110°C and immediately poured onto cold plates. The mixtures are size-reduced in a cross-beater mill and the fraction with a grain size of from 30 to 120 μ sifted out.

The powders obtained are each scattered through a 100 μ sieve onto glass plates in a layer thickness of around 100 μ and the plates subsequently baked for 30 minutes at 200°C. The weight loss of the glass plate amounts to 0.5%, based on the powder mixture applied. A high-gloss, pore-free satisfactorily levelling coating is obtained.

After cooling and storage for 14 hours, xylene is poured over the plates in trays at 20°C and the plates subsequently stored in the xylene. After about 30 minutes, the coating becomes detached along the edges of the plates and after 4 hours the coating is totally destroyed.

EXAMPLE 1

As in the comparison Example, resins A and B are each mixed with 7.5 g of adipic acid and 0.4 g of benzyl dimethyl amine following the addition of 10 g of hexamethylene diisocyanate blocked with 2 mols of α-caprolactam, m.p. 64°–68°C, and the resulting mixture is baked onto glass plates as described above. The weight loss amounts to 1%, based on the powder mixture applied. The high-gloss coatings are pore-free.

The coated plates are again subjected to the xylene test. After storage in xylene for 4 hours, neither resin mixture showed any signs of change. After 24 hours, the layer shows some signs of attack along its edges although it is still intact. The plates are removed from the xylene bath and regenerated in air for 24 hours. The original pencil hardness of 4H has fallen to 2H. The plates still show their high-gloss even surface.

EXAMPLE 2

Example 1 is repeated except that 20 g of a prepolymer with ε-caprolactam-blocked isocyanate groups of 1 mol of diethylene glycol and 2 mols of 1-isocyanato-3,3,5-trimethyl-5-isocyanato methyl cyclohexane melting at 80°C are used instead of the ε-caprolactam-blocked hexamethylene diisocyanate. Mixing and application are carried out as in Example 2. The results of the xylene test are the same as in Example 1. The layers again remain intact after storage in xylene for 24 hours. The weight loss during baking amounts to 1.2%, based on the powder lacquer mixture applied. The coating is pore-free.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:
1. A pulverulent solvent free composition of matter suitable as a binder for powder lacquers comprising mixtures of
   A. 40 to 98 parts by weight of copolymers with an average molecular weight of from 3,000 to 20,000 of
      i. 20 to 60% by weight of styrene, α-methylstyrene, o-chlorostyrene, p-chlorostyrene, p-tert. butyl styrene or mixture thereof
      ii. 30 to 65% by weight of acrylic acid alkyl ester with 1 to 12 carbon atoms in the alkyl radical and/or methacrylic acid alkyl ester with 2 to 12 carbon atoms in the alkyl radical;
      iii. 0 to 30% by weight of methacrylic acid methyl ester and
      iiii. 3 to 20% by weight of acrylic acid and/or methacrylic acid glycidyl ester;
   B. 1 to 20 parts by weight of a polycarboxylic acid and/or polycarboxylic acid anhydride, and
   C. 1 to 20 parts by weight of a blocked polyisocyanate.
2. The composition of matter of claim 1 wherein the blocked polyisocyanate is blocked by ε-caprolactam.
3. The composition of matter of claim 1 wherein the copolymers have an average molecular weight of from 6,000 to 10,000.

* * * * *